Patented Nov. 1, 1938

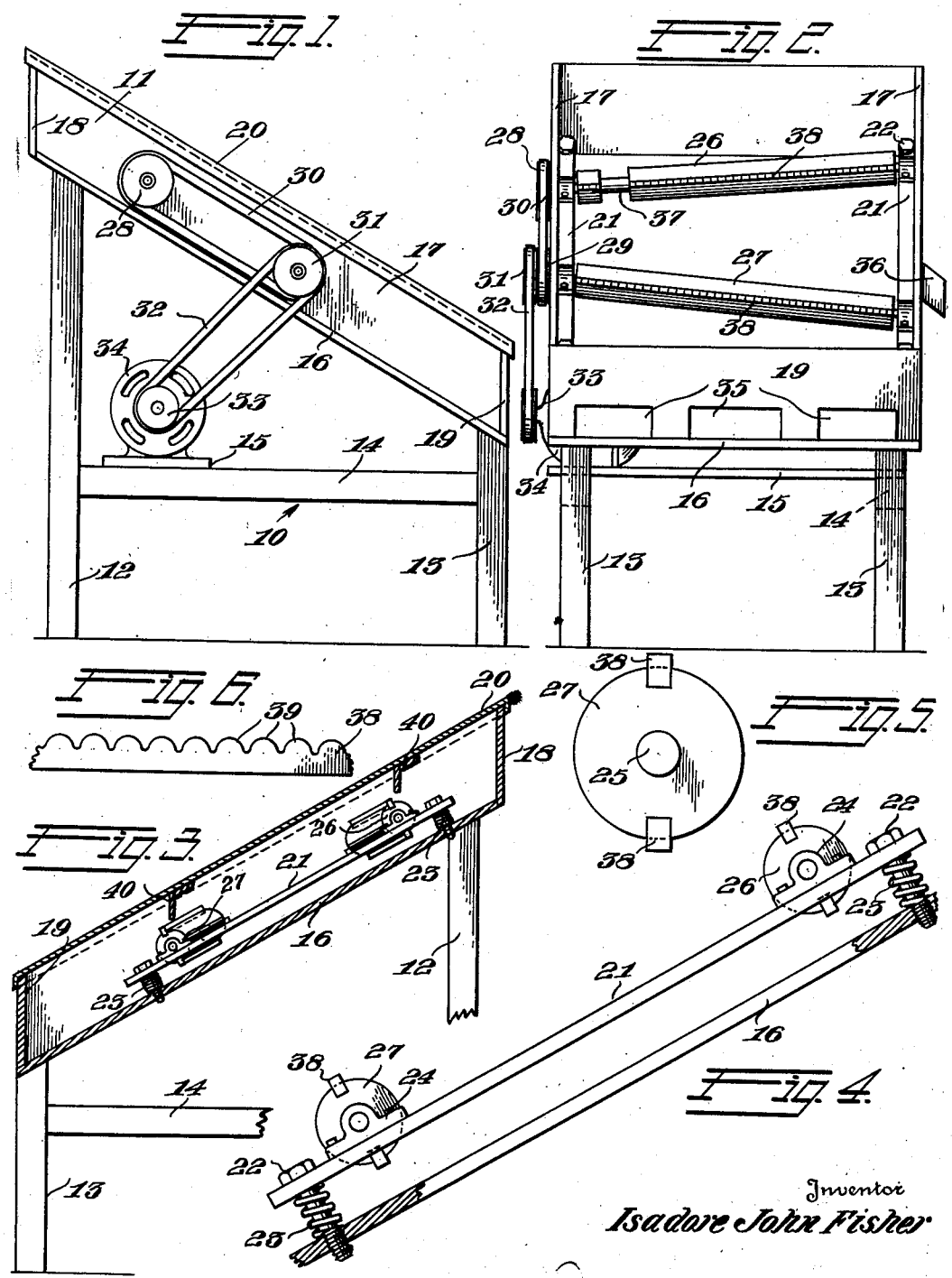

2,135,393

UNITED STATES PATENT OFFICE 2,135,393

MACHINE FOR HULLING NUT MEATS FROM THEIR SHELLS

Isadore J. Fisher, Dallas, Tex.

Application June 8, 1937, Serial No. 147,103

6 Claims. (Cl. 146—8)

This invention relates to a machine for hulling nut meats from the shells.

More specifically, the invention relates to a machine for hulling the meats from the shells of nuts, particularly pecans which have been previously cracked either by hand or by machine.

It is well known that the act of hulling the meats from the shells of nuts and particularly pecans, regardless of the care exercised in cracking the nuts, is monotonous, tiresome, and time consuming when done by hand which has heretofore been the usual practice.

A primary object of the present invention is the provision of a machine capable of hulling the meats from the shells of a large quantity of cracked nuts in a relatively short period of time.

A further object of the invention is the provision of a machine embodying a plurality of beaters and means for feeding the cracked nuts by gravity to the beaters in succession whereby the successive impacts of the beaters on the cracked nuts effect substantially complete separation of the meats and shells.

A still further object of the invention is the provision of a machine as a means for separating the meats from the shells of cracked nuts which is simple in construction, effective in operation, and is capable of being manufactured and sold at relatively low cost.

With the above objects in view, as well as others which will become obvious in the course of the following disclosure, reference will be made to the accompanying drawing, forming part of same, and wherein Figure 1 is a side elevational view of a machine constructed in accordance with a preferred embodiment of my invention.

Fig. 2 is a right end elevation of the machine as illustrated in Fig. 1.

Fig. 3 is a longitudinal section viewed from the opposite side of the machine as illustrated in Fig. 1.

Fig. 4 is an enlarged view partially in section and partially in elevation disclosing the preferred means for journalling the rollers embodied in the machine.

Fig. 5 is an end elevation of one of the rollers on an enlarged scale.

Fig. 6 is a side elevation of one of the inserts or beaters embodied in the machine.

Referring to the drawing by reference characters, and wherein like characters designate like parts, 10 designates a frame which may be of any suitable material and construction for supporting an inclined trough or chute 11.

The frame 10 as illustrated embodies a pair of relatively long legs 12 for supporting the higher end of the chute 11 and a pair of relatively short legs 13 for supporting the lower end of the chute 11, the frame further embodying a pair of laterally spaced horizontal members 14 on which is disposed a motor support 15. While the chute 11 is disclosed as being supported on the legs 12 and 13 in a fixed inclination, suitable means may be provided for adjusting such inclination.

The chute 11 embodies a floor 16, opposite sides 17 of a suitable height, ends 18 and 19, and a removable cover 20. Disposed within the chute 11 closely adjacent the sides 17 is a pair of bars 21 each of which is adjustably supported in vertically spaced relation to the floor 16 by bolts 22 adjacent the ends thereof, as is more clearly illustrated in Fig. 4. Each of the bolts 22 is threaded into the floor 16 and a relatively heavy coil spring 23 encircles the bolt with its opposite ends engaging the floor 16 and bar 21 for maintaining the bar in engagement with the head of the bolt 22.

The bolts 22 may be replaced by studs rigidly fixed in the floor 16 and having nuts on the projecting ends for effecting adjustment of bars 21, particularly if the chute be constructed of wood.

Secured to each of the bars 21 is a pair of bearings 24, the bearings on one of the bars being closer each other than the bearings on the other bar as is more clearly indicated in Fig. 2.

Journalled in the bearings 24 are the reduced ends 25 of rollers 26 and 27 which, in keeping with the varied spacing of the bearings 24 on bars 21, are inclined relatively to each other and the ends 18 and 19 of chute 11, as is clearly indicated in Fig. 2.

The reduced ends 25 of the rollers 26 and 27 at the adjacent or nearer ends thereof project through the adjacent side 17 and have fixed thereto grooved pulleys 28 and 29 which are operatively engaged by a V-belt 30 for transmitting rotation of roller 27 to roller 26.

Fixed to extension 25 of roller 27 adjacent to and outwardly of pulley 29 is a grooved pulley 31 which is operatively engaged by a V-belt 32 which also operatively engages a grooved pulley 33 on an electric motor 34 suitably secured to the support 15. The lower end 19 is provided with discharge openings 35, and a suitable discharge trough 36 is provided which opens through the side 17 above the lower end of roller 27.

As is clearly illustrated in Fig. 2, the roller 26 is inclined downwardly toward the belt drive while roller 27 is inclined downwardly away from the belt drive. This may be reversed, however, it being sufficient only that the rollers be inclined whereby nuts fed into the upper end of the chute 11 will travel by gravity toward the lower end of the chute along the successive rollers.

The roller 26 is provided adjacent its lower end with a reduced portion 37 providing a nut exit opening and each of the rollers is provided with diametrically disposed inserts or beaters 38 which may be constructed of wood, leather, steel or any other material found most suitable for their particular use.

The inserts 38 are each preferably provided with ribs or corrugations, as is indicated at 39 in Fig. 6.

The removable cover 20 may be secured in position by any suitable means and is provided with a pair of angle irons 40 for a purpose hereinafter described.

Having described a preferred construction of the machine constituting my invention, the operation thereof is as follows:

Nuts which have been cracked are fed into the chute 11 above the roller 26 by any suitable means, as e. g. by a conveyor which may be utilized to deliver the nuts from a cracking station to the chute in advance of the roller 26.

The rollers 26 and 27 are rotated in the same direction and at relatively high speed by means of belts 30 and 32 and electric motor 34. The nuts will be subjected to a beating action by the ribbed inserts 38 carried by the roller 26 and the nuts while being thus acted upon will slowly gravitate toward the lower end of the roller, and upon reaching the exit opening defined by the reduced portion 37 will pass into the space in advance of the second roller 27 adjacent the higher end thereof.

The nuts will be similarly acted upon by the ribbed inserts 38 carried by the roller 27, and upon reaching the lower end thereof or previous to such time, the hulling will have been completed and the separated meats and shells will gravitate to the lower end of the chute and pass through openings 35 into a suitable receptacle or onto a conveyor.

While practically all the nuts will have been sufficiently treated to effect hulling of the meats from the shells upon reaching the lower end of roller 27, still any which may not have been so treated or those imperfectly separated will pass out through the trough 36.

The cracked nuts are dependent upon the beating action of the ribbed inserts or beaters 38 for effective separation of the meats from the shells, the nuts resting upon the floor 16 and constantly gravitating toward the lower or exit end of the chute, and for most efficient action the rollers 26 and 27 should be disposed at a predetermined distance above the floor 16, dependent upon the size and character of nuts being treated, and the spacing of the rollers from the floor can be readily adjusted by means of the bolts 22, the springs 23 normally maintaining the rollers in any adjusted position relative to the floor 16.

The vertically disposed flanges of the angle irons 40 terminate closely above the rollers 26 and 27 and thus act to prevent the nuts from passing between the rollers and cover 20.

While the machine as disclosed embodies only two inclined rollers, and which are sufficient for effective hulling of the meats from the shells, nevertheless additional rollers may be provided if desired, and the chute 11 may be supported for adjustment of the inclination thereof.

The chute may be constructed of any desired material, but if constructed of wood the floor 16 and sides 17 should be covered with sheet metal to provide smooth surfaces whereby the nuts will readily gravitate toward the lower end of the chute.

While I have disclosed but a single specific embodiment of my invention, same is to be considered as illustrative only, and not restrictive, the scope of the invention being defined in the sub-joined claims.

What I claim and desire to secure by U. S. Letters Patent is:

1. A machine for hulling or shelling nuts comprising an inclined chute, a pair of oppositely inclined rollers spaced longitudinally of the chute and having their opposite ends journaled adjacent opposite sides of the chute, means projecting from the surfaces of the rollers for agitating and beating the nuts resting on the floor of the chute adjacent the rollers as they progressively advance downward in the chute, an opening in a side wall of the chute in advance of the lowermost roller for discharging partially shelled nuts, and openings in the lower end of the chute for discharging completely shelled nuts.

2. The structure defined in claim 1, wherein the rollers are journaled in adjustable bearings yieldably supported from the floor of the chute.

3. A machine for hulling or shelling nuts comprising an inclined nut-receiving receptacle having a bottom, sides, upper and lower ends, and a cover, a bar adjacent each of said sides and within the receptacle, a pair of bearings supported by each of the bars in unequally spaced relation, nut agitating and beating rollers oppositely inclined relative to the ends of the receptacle journaled in said bearings, means for rotating the rollers in unison, yieldable means supporting said bars in spaced relation to the floor of the receptacle, and adjustable means for moving the bars toward the floor against the action of said yieldable means for spacing the rollers from the floor for most effective agitating and beating action upon nuts of various sizes.

4. The structure defined in claim 3, wherein said cover is provided with projections extending transversely thereof and above said rollers for preventing passage of nuts between the cover and the rollers.

5. A machine for hulling or shelling nuts comprising an inclined chute for receiving and permitting gravitational feed of nuts from the upper end thereof, a pair of spaced rollers having their opposite ends journaled adjacent opposite sides of the chute, the rollers being equally spaced from the bottom of the chute and each provided with agitating and beating means for successively acting upon the nuts resting upon the floor of the chute adjacent the respective rollers as they progressively advance forwardly in the chute, and wherein the first of said rollers encountered by the nuts is provided with a reduced portion intermediate its ends to permit the partially shelled nuts to pass therethrough for further agitating and beating action by the other roller.

6. A machine for hulling or shelling nuts comprising an inclined chute for receiving and permitting forward movement of the nuts, and a roller having its opposite ends journaled adjacent the opposite sides of the chute and provided with agitating and beating means for acting upon the nuts resting upon the floor of the chute adjacent the roller as they progressively advance toward the roller, and wherein said agitating and beating means comprises ribbed bars extending longitudinally of the roller.

ISADORE J. FISHER.